United States Patent [19]
Chalmers

[11] Patent Number: 5,114,190
[45] Date of Patent: May 19, 1992

[54] ELECTRICALLY INSULATED TUBE UNION

[75] Inventor: Robert C. Chalmers, Huntsville, Ala.

[73] Assignee: Parker Hannifin Corporation, Cleveland, Ohio

[21] Appl. No.: 759,782

[22] Filed: Aug. 27, 1991

Related U.S. Application Data

[63] Continuation of Ser. No. 598,299, Oct. 16, 1990, abandoned.

[51] Int. Cl.[5] .............................................. F16L 47/00
[52] U.S. Cl. .................................... 285/53; 285/52; 285/247; 285/332.4; 285/423
[58] Field of Search ............... 285/53, 48, 52, 334.2, 285/334.3, 334.4, 341, 247, 907, 423, 50, 332.4

[56] References Cited

U.S. PATENT DOCUMENTS

| Re. 25,047 | 9/1953 | Risley ........................... 285/48 |
| 3,326,582 | 6/1967 | Currie .......................... 285/341 |
| 3,451,697 | 9/1966 | Bula ........................ 285/334.4 X |
| 3,686,747 | 8/1972 | Bagnulo ................... 285/334.4 X |
| 3,992,043 | 11/1976 | Whitley ..................... 285/423 X |
| 4,030,742 | 6/1977 | Eidelberg et al. ............. 285/343 |
| 4,595,218 | 6/1986 | Carr et al. ...................... 285/47 |
| 4,886,938 | 12/1989 | Rottmar et al. ............ 285/907 X |

OTHER PUBLICATIONS

Technical Bulletin No. 1-87 "Dielectric Fittings" (From Cajon Company-a Swagelok Company).

*Primary Examiner*—Randolph A. Reese
*Assistant Examiner*—Timothy Aberle
*Attorney, Agent, or Firm*—Ralph E. Jocke

[57] ABSTRACT

An electrically insulated tube union includes a pair of tube fitting assemblies and an electrically non-conductive connector. Each tube fitting assembly has a fitting body, a fitting nut and a threaded ferrule. The connector has a body with an external radial flange between the ends thereof. The connector body is externally threaded on either side of the flange and the threads are axially spaced from the connector ends. The ferrules threadably engage the connector threads and are captured between their respective fitting nut and body. Each ferrule has a tapered end with an unthreaded portion that seats in a frusto-conical portion of the fitting body so that when the fitting nut and body are threadably engaged the ferrule unthreaded end grips the unthreaded connector ends to provide a fluidtight and electrically insulated coupling between the pair of tube fitting assemblies.

2 Claims, 1 Drawing Sheet

ELECTRICALLY INSULATED TUBE UNION

This is a continuation of copending application Ser. No. 07/598,299 filed on Oct. 16, 1990, now abandoned.

BACKGROUND OF THE INVENTION

The present invention relates generally to fluidtight couplings for tubing, conduits and other fluid handling equipment. More specifically, the invention relates to electrically insulated fluid tube couplings.

There are numerous fluid transfer applications where it is desirable to interrupt the electrical conductivity of a fluid path or conduit. One approach has been to interconnect an electrically insulated coupling in the tubing to break the electrical continuity of the fluid path.

The prior coupling designs, however, have used complicated designs that require not only extra components per fitting, but also a high number of costly, specialized parts with the inevitable higher assembly time and cost.

The need exists, therefore, for a low cost, simple-to-use electrically insulated fluid coupling that utilizes conventional tube fitting components and can withstand high operating pressures.

SUMMARY OF THE INVENTION

The present invention contemplates an electrically insulated fluid coupling that can conveniently be used to join common tubing, pipe, and the like using mostly standard tube fitting components. According to one aspect of the invention, such a coupling uses a pair of conventional tube fitting assemblies. Each assembly has a tube fitting body, a tube fitting nut and a ferrule. In the preferred embodiment, the ferrule is of conventional design and size, except that it is partially internally threaded.

According to another aspect of the invention, such a coupling includes an electrically insulative connector piece that threadably interconnects the two fitting assemblies. Such a connector has a body with a through bore between two ends. Certain portions of the body are externally threaded to threadably engage with the ferrules.

An external radial flange is provided about the connector body periphery intermediate the connector body ends. This flange is preferably greater in diameter than the fitting nuts to help prevent electrical shorts across the nuts.

Another aspect of the invention provides that the connector body threads are axially spaced from the ends thereof. This permits each ferrule to grip a generally smooth surface of the connector body.

Still another aspect of the invention is the simple assembly procedure for this coupling. By using conventional tube fitting components and threaded engagement, the invention provides a coupling that essentially assembles as quickly as a conventional tube fitting. Cost of the coupling is low because of the use of conventional tube fitting assemblies.

These and other aspects and advantages of the present invention are more fully set forth and will be appreciated by those skilled in the art from the following specification in view of the accompanying drawing.

DESCRIPTION OF PREFERRED EMBODIMENTS

Figure 1:
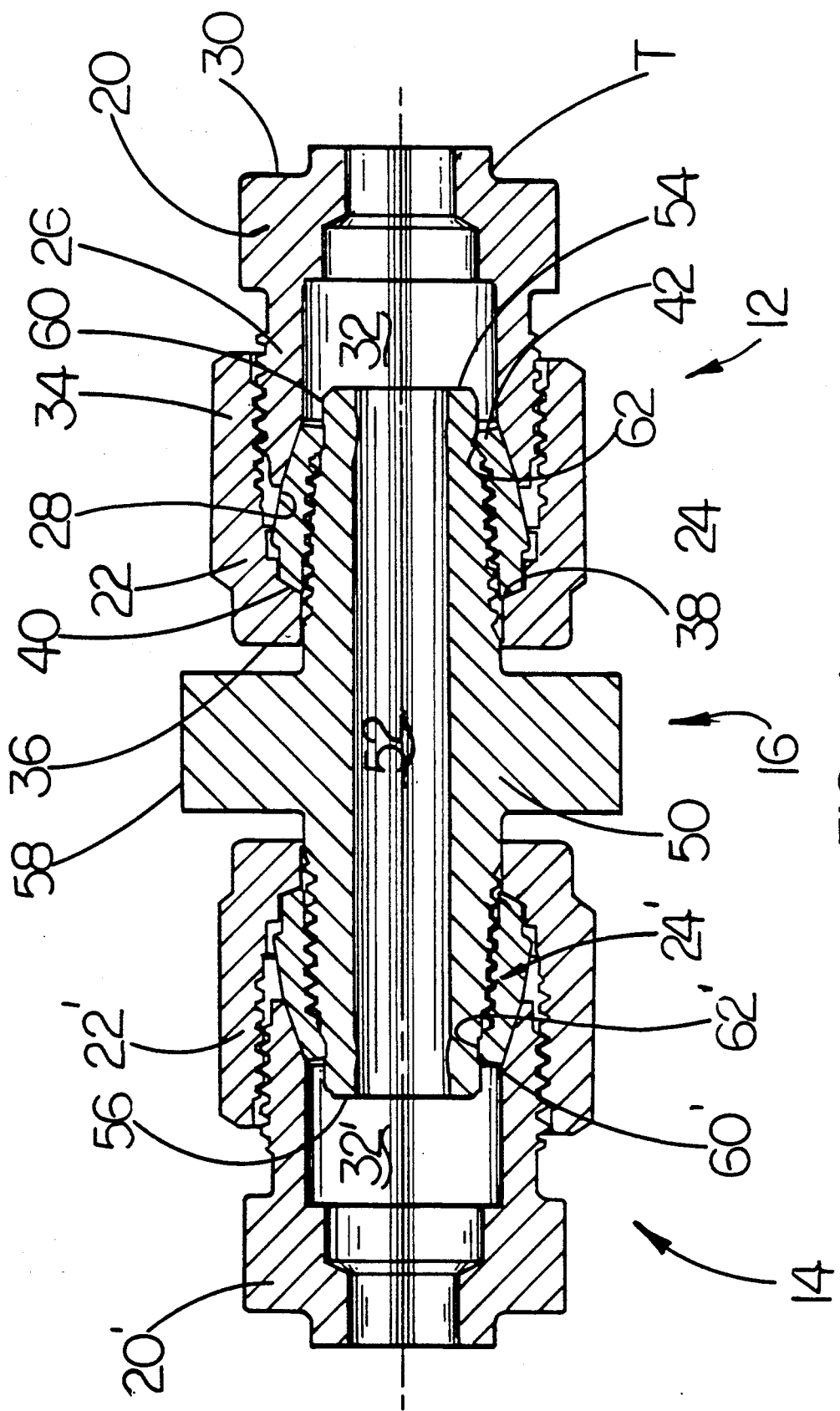
FIG. 1 is a longitudinal section view of an electrically insulative fluid coupling according to the present invention.

With reference to FIG. 1, an electrically insulative fluid coupling according to the present invention is generally indicated by the numeral 10. Such a coupling includes a first tube fitting assembly 12, a second tube fitting assembly 14, and an electrically insulative connector 16. As will be explained more fully hereinbelow, the connector 16 interconnects the tube fitting assemblies 12, 14 in such a manner as to interrupt and prevent electrical conductivity between the two fitting assemblies, while at the same time permitting uninterrupted high-pressure fluid flow.

In the preferred embodiment, the tube fitting assemblies 12, 14 are substantially identical so that a detailed description of only one will suffice to fully describe the invention. (Corresponding parts on the other fitting assembly are assigned the same reference numeral followed by a prime '.) Those skilled in the art will appreciate, of course, that the two tube fitting assemblies need not be identical in terms of dimensions or downstream connections to tubing or other fluid conducting members.

Each tube fitting assembly includes a fitting body 20, a fitting nut 22, and a ferrule 24. These components preferably are of conventional design, with the exception that the ferrule 24 is internally threaded for purposes that will be explained hereinafter. As will also be explained herein, the threaded ferrule is preferred but not indispensable. The present invention can be used with an unthreaded ferrule when operating the coupling 10 at lower fluid pressures.

The fitting body 20 includes a threaded male extension 26 that terminates with an internal frusto-conical portion 28. The opposite end 30 can be connected directly to pipe, tubing or the like "T" in a conventional manner or with any number of commonly available tube fittings. A central bore 32 passes through the fitting body 20 from end to end thereof.

The fitting nut 22 includes a threaded female cylinder 34 which threadably mates up with the male extension 26 on the fitting body 20. The fitting nut 22 further includes an inwardly projecting flange 36 on an end that is axially spaced from the nut 22 threads. The flange 36 forms an inner shoulder 38.

The ferrule 24 is preferably a single piece ferrule having a first end or load bearing surface 40 and an opposite inwardly tapered end 42 sized to seat against the frusto-conical portion 28 of the fitting body 20, such that as the fitting nut 22 and body 20 are made up, the ferrule tapered end 42 is compressed by force from the camming action with the frusto-conical surface 28.

In accordance with the present invention, the connector 16 is preferably made from an electrically insulative brand material such as Nylon ®or PEEK ®. The particular material selected is a matter of design choice but it is preferred that the material be threadable.

The connector 16 has a body 50 with an axial bore 52 therethrough from end 54 to end 56. A flange 58 is provided about the outer periphery of the connector body 50 intermediate the ends 54, 56 thereof. Preferably, the flange 58 is an integral radial extension of the connector body 50 and has a radial length greater than the maximum diameter of the fitting nuts 22, 22'.

The outer periphery of the body 50 is threaded on both sides of the flange 58. The threads are preferably axially spaced from both the flange 58 and the connector body ends 54, 56. This provides an unthreaded body surface 60 that the ferrules grip when compressed by the nut and body fittings.

Each ferrule 24 is internally threaded so as to threadably engage with the threaded connector body 50. The ferrule 24 threads are axially spaced from the ferrule tapered end 42 so that a smooth grip or crimp area 62 is provided at the tapered end of the ferrule. Since the tapered end of the ferrule 24 is unthreaded, the ferrule 24 can only be threaded onto the connector body 50 up to a point where the grip portion 62 of the ferrule overlays the unthreaded surface 60 of the connector body ends.

Assembly of the electrically insulated coupling 10 is simple and quick. The ferrule 24 is seated in the frusto-conical portion 28 of the fitting body 20. The fitting nut 22 is then threaded onto the male extension 26 until the shoulder 38 of the nut flange 36 abuts the ferrule bearing surface 40. The nut 22 may be hand tightened snug so the ferrule 24 is captured and does not turn when the connector 16 is inserted.

Next the connector 16 can be screwed into the fitting assembly 12. The connector 16 will threadably insert until the ferrule 24 is fully threaded thereon. Now the nut 22 can be tightened up so as to crimp the ferrule onto the connector body 16 as previously described. The procedure is then performed for the fitting assembly 14 on the opposite connector end.

Thus, an electrically isolated coupling is provided that permits continued fluid flow through the fluid conduit. The connector body 16 is sized so that when it is threaded into the fitting assemblies 12, 14 the ends 54, 56 thereof extend into the bores 32 of the fitting bodies 20, axially spaced from the ferrule crimp areas 62. Because the connector body 50 is made of a compressible material, the ferrule grip on the connector provides an excellent seal against leakage. The threaded engagements between the ferrules and connector body also significantly contribute to the seal integrity at higher fluid operating pressures, for example, pressures exceeding 500 psi.

It will be noted that preferably the fitting nut 22 does not seat against the connector body flange 58. This is a result of the fact that the ferrule 24 only partially threads onto the connector body and prevents excess stress being applied to the flange 58 add simplifies assembly.

By providing a connector body flange 58 that has a radial dimension greater than the largest nut 22 diameter, accidental electrical shorts or arc-over across the nuts 22, 22' such as by an inadvertent tool can be reduced.

As previously noted herein, the present invention can also be used without a threaded ferrule 24 and without the connector body 50 being threaded. The threaded approach is preferred, however, because it permits substantially increased fluid operating pressure without leakage.

Among the advantages the present invention offers over prior designs is the simplicity of this design in not requiring the use of o-rings and polymer spacers and seals that require more time consuming and less reliable assembly. By using conventional tube fitting components the coupling can be interconnected into virtually any tubing or pipe system. The assembly procedure is virtually the same as any ferrule tube fitting assembly thus making field assembly practical and quick.

While the invention has been shown and described with respect to a particular embodiment thereof, this is for the purpose of illustration rather than limitation, and other variations and modifications of the specific embodiments herein shown and described will be apparent to those skilled in the art within the intended spirit and scope of the claimed invention.

What is claimed is:

1. An electrically insulated tube union for connecting first and second pieces of electrically conductive tubing and for enabling fluid flow between said pieces, while preventing the conduction of electricity between said pieces, comprising:

a) first and second tube fitting assemblies fixably mounted on said first and second tubing pieces respectively, each assembly having a fitting body, a fitting nut having an outer surface with a maximum diameter, and a ferrule; said fitting nut of each assembly consisting of electrically conductive material, each nut in electrical connection with the tubing piece on which the assembly including the nut is mounted;

b) each fitting body including an externally threaded portion, an internal frusto-conical portion at one end and another end joined to said tubing piece, there being a through bore extending between said ends;

c) each fitting nut internally threaded and mateably with its respective threaded fitting body, and having a radially inward extending flange at one end;

d) each ferrule being captured between its respective fitting nut and body when assembled, with one ferrule end engaging said nut flange and another ferrule tapered end compressed by said body frusto-conical portion;

e) an electrically insulative connector having a body consisting of electrically non-conductive material with a through bore between a first end sized to extend partially into said first fitting body bore through said ferrule, and a second end sized to extend partially into said second fitting body bore through said other ferrule; said connector body having an external flange between said ends; said flange extending radially outward beyond said maximum diameter of each of said fitting nuts;

f) said body of said insulative connector including a first tapered frusto-conical portion, said first frusto-conical portion of said connector including first external threads, said body further including a first unthreaded external surface extending between said first frusto-conical portion and said first end, and a first inboard unthreaded external surface extending between said first frusto-conical portion of said body and said flange;

g) the body of said insulative connector further including a second tapered frusto-conical portion, opposed of said first frusto-conical portion of said body, said second frusto-conical portion including second external threads, said body further including a first unthreaded external surface extending between said second frusto-conical portion and said second end, and a second inboard unthreaded external surface extending between said second frusto-conical portion and said flange;

h) said ferrules each including an internal frusto-conical portion overlying said respective frusto-conical portion of said fitting body, each said ferrule frusto-conical portion being internally threaded and engaging the threads on said respective body frusto-conical portion, said threads being spaced form said ferrule tapered end and from an end opposed of said threaded tapered end; said unthreaded ferrule tapered end of each ferrule gripping said respective unthreaded external surface of said fitting body under force exerted through camming action between said fitting body frusto-conical portion and said ferrule tapered end when said respective fitting body and nut are threadably engaged; said opposed end of each ferrule being disposed from said of said flange of said insulative connector body, whereby the inward extending flange of each respective nut is disposed of said outward extending flange of said insulative connector body when said respective body and nut are threadable engaged;

i) whereby said tube union enables fluid tight connection at high fluid pressure between said tubing pieces while electrically isolating said tubing pieces, said flange minimizing risk of electrical connection between said tubing pieces by adjacent conductive surfaces.

2. An electronically insulated tube union according to claim 1 where said connector is made of nylon material.

* * * * *